June 6, 1950     E. P. TURNER ET AL     2,510,917
ELECTRIC MOTOR WITH CLUTCH BRAKE DEVICE
Filed June 10, 1948     3 Sheets-Sheet 1

INVENTORS
Edgar P. Turner, Reynold Happe
and Ross D. Ingalls
BY William P. Stewart
ATTORNEY WITNESS
N. Leszczak

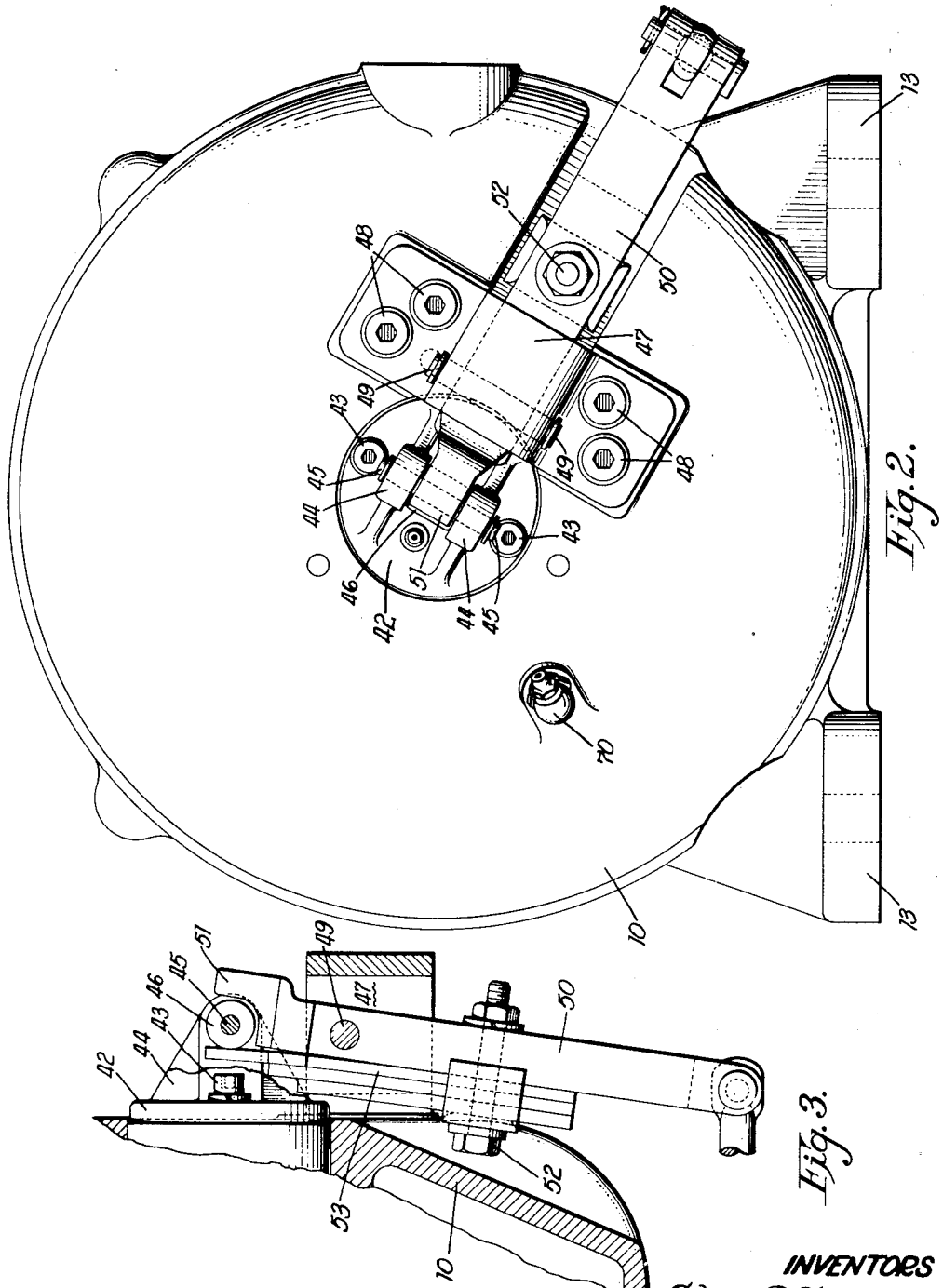

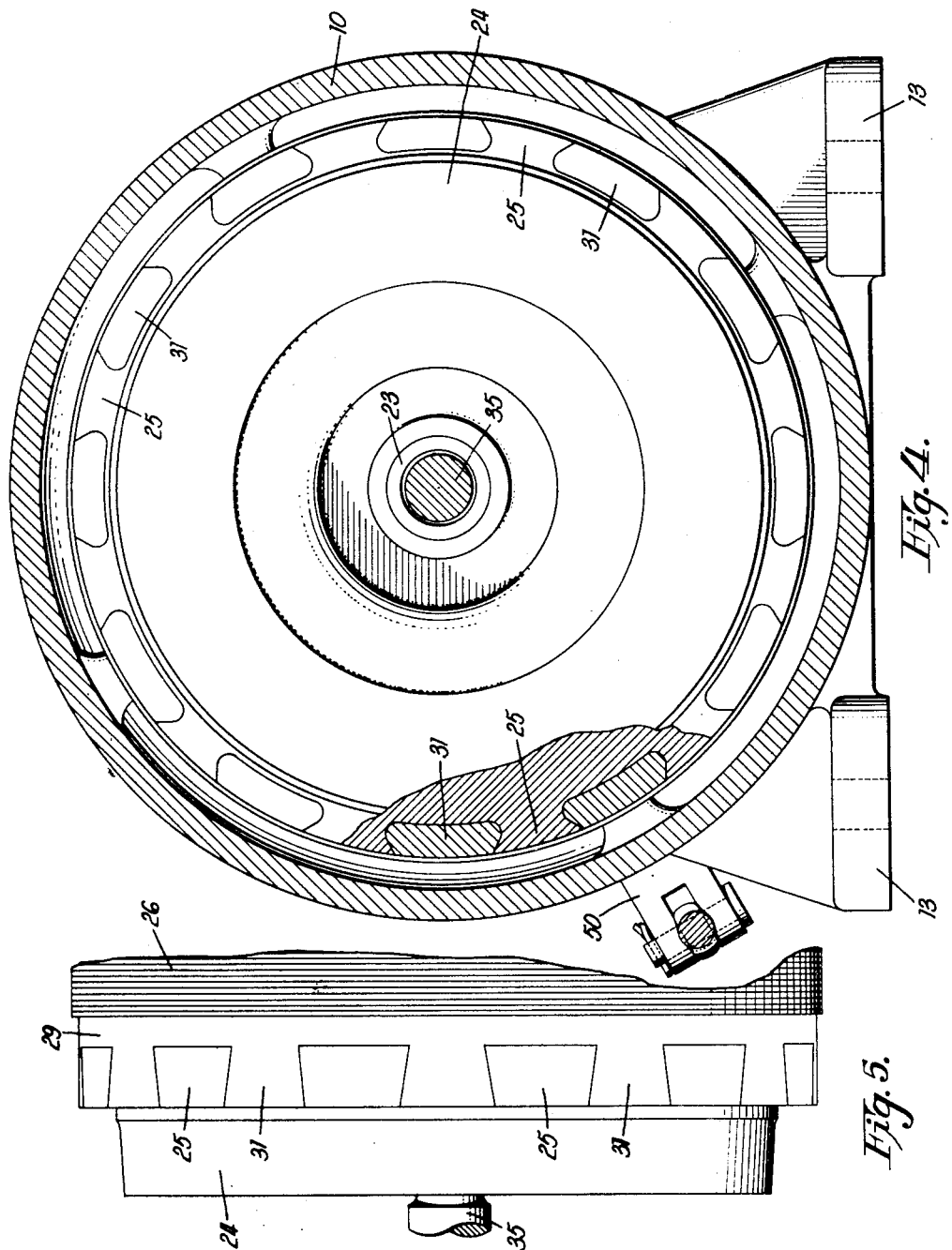

Patented June 6, 1950

2,510,917

UNITED STATES PATENT OFFICE 2,510,917

ELECTRIC MOTOR WITH CLUTCH-BRAKE DEVICE

Edgar P. Turner, Fanwood, Reynold Happe, Pittstown, and Ross D. Ingalls, New Providence, N. J., assignors to The Singer Manufacturing Company, Elizabeth, N. J., a corporation of New Jersey Application June 10, 1948, Serial No. 32,234

8 Claims. (Cl. 172—120)

This invention relates to electric power transmitters for machines, such as looms, which are required to start and stop quickly and it is one of the objects of this invention to produce an improved electric power transmitter which is rugged, has a small overall dimension, can be readily attached to and detached from the loom as a unit for the purpose of inspection and repair, and in which the bearings for the driven shaft are widely spaced with resultant low bearing loads.

Another object of the invention is to provide an improved rotor of the inverted type having die cast conductor bars and end rings dovetailed to a cast iron spider which serves the triple function of supporting the rotary electromagnetic element of the motor, providing the necessary inertia, and offering a suitable clutch driving metallic face against which the friction facing on the driven element may engage without appreciable wear.

Another object of this invention is to provide improved mechanism for shifting the driven clutch element into engagement with the driving clutch element and for yieldingly maintaining the driving and driven clutch elements in contact.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the accompanying drawings:

Fig. 2 is a right end elevation of the transmitter shown in Fig. 1.

Fig. 3 is a fragmentary view showing the actuating lever for shifting the driven element.

Fig. 4 is a sectional view taken on the line 4—4 of Fig. 1.

Fig. 5 is a fragmentary view of the external rotor showing the dovetail connection between the die cast rotary electromagnetic element of the motor and the cast iron spider.

Figure 1:
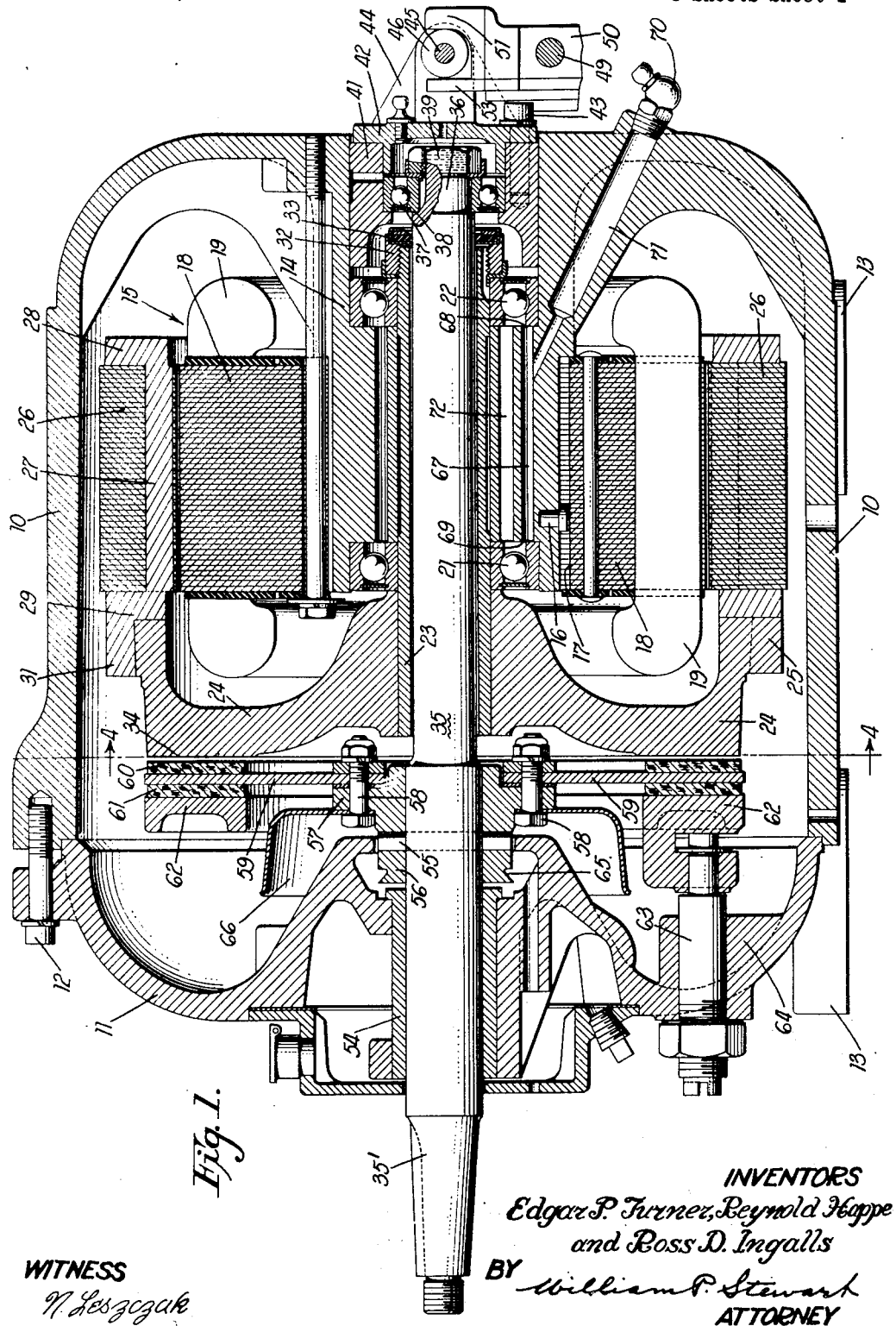
Fig. 1 is a longitudinal vertical sectional view taken substantially through the center of an electrical power transmitter embodying the invention.

In the preferred embodiment of the invention, the transmitter is formed with a hollow cylindrical frame comprising the parts 10 and 11 which are secured together by screws 12. The part 10 is formed with attaching feet 13 and an inwardly extending centrally located tubular portion 14. Carried on the outer periphery of the tubular portion 14, is a stationary electromagnetic element or stator 15, keyed to the tubular portion 14 by means of a headed lug 16 having its shank fixed in a suitable aperture in the tubular portion and its head extending into a slot 17 milled in the stator. The stator 15 comprises a stack of externally toothed laminations 18 and is provided with windings 19 of any desired type.

Journaled in the ball-bearings 21 and 22, which are carried by the tubular portion 14 of the frame, is a tubular motor-shaft 23 and secured to its outboard end is a cast iron spider 24 having its peripheral rim portion formed with a series of wedge shaped lugs 25. The rotary electromagnetic element of the motor comprises a stack of laminations 26, integrally cast conductor bars 27, and end rings 28 and 29. The conductor bars 27 and end rings 28 and 29 are die cast of almost pure aluminum and are cast integral with the spider 24. This is accomplished by placing the cast iron spider in the die and when the conductor bars and end rings are cast the aluminum flows between the wedge-shaped lugs 24 forming complemental lugs 31 on the end ring 29. The rotary electromagnetic element and the cast iron spider 24 are thus dovetailed together and become a single integral electric motor rotor and driving clutch element having a flywheel effect and a suitable clutch-engaging surface.

In order to hold the shaft 23 against lateral displacement relative to its bearings 21 and 22, the end of the shaft opposite the spider 24 is threaded to receive a nut 32, carrying a synthetic rubber washer 33 which prevents lubricant from travelling along the inner surface of the tubular shaft 23 and to the clutch engaging surface 34 of the spider 24.

Extending through the tubular motor shaft 23 is a driven shaft 35 having its reduced end 36 journaled in a ball-bearing 37. As shown in Figs. 1 and 4, the shaft 35 has an external diameter which is less than the internal diameter of the tubular shaft 23 and, therefore, is free of engagement with the shaft 23. The inner race of the ball-bearing 37 is held between a shoulder 38 on the shaft 35 and a nut 39 threaded on the end of the shaft, and the outer race is clamped between the slidable guide member 41 and a cover-plate 42 which is secured to the guide member 41 by screws 43. The cover-plate 42 is formed with two spaced outwardly extending ears 44, the outer ends of which are apertured to receive a pivot pin 45 carrying a roller 46 located between the spaced ears 44.

For the purpose of moving the driven shaft 35 endwise, a U-shaped strap 47 is secured by the screws 48 to the frame 10 and pivotally secured between the limbs of the U-shaped bracket 47 by the pin 49 is a lever 50 having an offset portion 51 located on one side of the roller 46. Fixed to the lever 50 by the bolt 52 is a leaf-spring 53 the free end of which extends on the opposite side of the roller 46. The end 51 of the lever 50 and the free end of the leaf-spring 53 thus embrace the roller 46 and, when the lever 50 is moved about its pivot 49, the cover-plate 42 and the guide-member 41 will be shifted laterally and this movement is imparted to the shaft 35 through the ball-bearing 37.

The other end 35' of the shaft 35 is adapted to receive a gear or other driving connection with the main driving gear of the loom, or similar machine, and adjacent the end 35' of the shaft 35 is journaled in a sleeve bearing 54 carried by the part 11 of the casing. Located within the casing and secured to the driven shaft 35 by the pin 55 is a hub 56 having a flange 57 to which is secured, by the bolts 58, a driven element 59 having cork friction rings 60 and 61 attached to its opposite faces. The ring 60 co-operates with the clutch engaging face 34 of the cast iron spider or driving element when the clutch is in driving engagement and the friction ring 61 cooperates with a brake-ring 62 carried by an adjustable screw 63 threaded in a boss 64 formed on part 11 of the casing, when the clutch is disengaged and the brake is applied.

In order to prevent oil which may leak from the bearing 54 from finding its way to the clutch and brake engaging surfaces, the hub 56 is formed with an oil sling 65 and a dish-shaped oil sling 66 is secured to the flange 57 of the hub by the screws 58.

To supply lubricant to the ball-bearings 21 and 22, we have provided the tubular portion 14 with a longitudinal lubricant conduit 67 the opposite ends of which are intersected by the outer race of each of the ball-bearings 21 and 22. The outer races of the ball-bearings only partially block the ends of the conduit 67 and thus small orifices 68 and 69 open into each bearing. The conduit 67 is supplied with lubricant through a grease fitting 70 screwed into the part 10 of the casing and connected to the conduit 67 by the inclined passageway 71. As both ends of the conduit 67 are restricted, the grease flows uniformly to each bearing and any excess of grease will pass through the ball-bearings into the space 72 located within the tubular portion 14 and between the bearings 21 and 22.

In the operation of the above described power transmitter, when the lower end of the lever 50, which is connected by a pull-rod to the controls of the loom, is pulled to the left as viewed in Fig. 3 the free end of the leaf spring 53 engages the roller 46 and yieldingly shifts the cover plate 42 and guide member 41 to the right as viewed in Fig. 1. This movement through the ball-bearing 37 shifts the driven shaft 35 longitudinally and causes the friction ring 60 to yieldingly engage the clutch engaging surface 34 of the rotating cast-iron spider 24, and through this frictional engagement the driven element 59 and driven shaft 35 are rotated. It will be understood that the spider 24 is constantly rotating and that the spider and electromagnetic element of the motor have a flywheel effect.

Also, that the cast iron spider serves the triple purpose of a support for the electromagnetic element, provides inertia, and because of its frictional characteristics and hardness offers an excellent metallic face for engagement by the friction ring 60.

When the control mechanism of the loom pushes the lower end of the lever 50 to the right, as viewed in Fig. 3, to cause the brake to stop the loom, the offset end 51 of the lever engages the roller 46 and forces the guide member 41 and cover plate 42 to the left as viewed in Fig. 1. This movement of these members through the ball bearing 37 shifts the shaft 35 longitudinally and disengages the driven clutch element 59 from the driving clutch element and forces the friction disk 61 into engagement with the brake ring 62 to stop the rotation of the driven shaft 62.

From the foregoing description it will be understood that the leaf spring 53 will yield after the driving and driven clutch surfaces are in engagement. This construction insures the proper clutch engaging forces at all times and compensates for wear of the clutch friction facing 60 due to continued use of the clutch.

Further, it will be observed that the driven shaft 35 is journaled in widely spaced bearings 54 and 37 and that the bearing 54 is a heavy duty sleeve bearing which is adapted to take the major portion of the load. It will also be observed that the transmitter has a small overall length and that the telescoping of the motor-shaft and driven shaft and the location of the driven shaft bearings provide a sturdy power transmitter of marked compactness.

From the above it will be understood that our improved power transmitter has a wide variety of uses and that various modifications and changes may be made therein without departing from the spirit of our invention or the scope of the appended claims.

Having thus set forth the nature of the invention, what we claim herein is:

1. A unitary electric power-transmitter comprising a hollow casing, a stator fixed to said casing, a tubular rotor shaft journaled in said casing, a rotor carried by said shaft and surrounding said stator, said rotor having a clutch engaging face, bearings located at the opposite ends of said casing, a driven shaft extending through said rotor shaft free of engagement therewith and journaled in said bearings, a driven clutch element carried by said driven shaft, and means for shifting said driven shaft endwise to cause said driven element to engage said rotor.

2. A unitary electric power-transmitter comprising a cylindrically shaped hollow casing having an inwardly extending tubular portion, a stator secured to said tubular portion, an external type rotor embracing said stator, a tubular rotor shaft journaled in bearings carried by the tubular portion of the casing and supporting said rotor, bearings carried by and located at the opposite ends of said casing, a driven shaft journaled in said bearings and extending through said rotor shaft, said driven shaft having an external diameter less than the internal diameter of the tubular rotor shaft, a driven element carried by said driven shaft and mechanism for moving said shaft endwise for causing the driven element to engage the rotor.

3. A unitary electric power-transmitter comprising a hollow casing formed of two parts, one of said parts having an inwardly extending tubular portion and the other of said parts being formed with a centrally located bearing, a stator secured to and supported by said tubular portion, a hollow rotor shaft journaled in said tubular portion, an external type rotor carried by said rotor shaft and extending over said stator, a driven shaft passing through said hollow rotor shaft free of engagement therewith and having one end journaled in a bearing carried by said tubular portion and its other end journaled in the bearing carried by the other part of the casing, a driven clutch element secured to said driven shaft, and mechanism for moving said driven shaft endwise to cause the driven element to engage the rotor of the motor.

4. A unitary electric power-transmitter comprising a hollow casing, a stator fixed to said casing, a tubular rotor shaft journaled in said casing, a rotor carried by said shaft and surrounding said stator, said rotor having a driving clutch engaging face, bearings located at the opposite ends of said casing, a driven shaft extending through said rotor shaft and journaled in said bearings, a brake carried by said frame and laterally spaced from said driving clutch engaging face, a driven clutch element carried by said driven shaft and disposed between said driving clutch engaging face and said brake, a lever pivotally secured to said casing and having a U-shaped end one limb of which is a leaf spring and mechanism operatively connecting said U-shaped end of the lever with said driven shaft for shifting the driven shaft endwise to cause said driven element to selectively engage the driving clutch engaging face or the brake.

5. A unitary electric power-transmitter comprising a hollow casing having a centrally located inwardly extending tubular portion, a stator fixed to said tubular portion, a shaft journaled in said tubular portion, a rotor carried by said shaft, said rotor comprising a cast iron spider having a dovetailed connection with the die cast rotary electromagnetic element of the motor, a driven clutch element adapted to engage said cast iron spider and actuating mechanism for moving said clutch element into and out of engagement with said spider.

6. A unitary electric power-transmitter comprising a hollow casing having a centrally located inwardly extending tubular portion, a stator fixed to said tubular portion, a shaft journaled in said tubular portion, a rotor carried by said shaft, said rotor comprising a cast iron spider supporting the rotory electromagnetic element of the motor, said electromagnetic element having die cast conductors bars and die cast end-rings one of which is dovetailed to the cast iron spider, a driven element adapted to engage the cast iron spider, and manually controlled mechanism for moving said clutch element into and out of engagement with said spider.

7. A unitary electric power-transmitter comprising a hollow cylindrical casing; a stator fixed to said casing; a rotor adapted to surround the stator; said rotor comprising laminated metal punchings with die cast aluminum conductor bars extending through said punchings, end-rings cast integral with said bars and a cast iron bell-shaped spider having a dovetail connection with one of said end-rings; a shaft journaled in said casing and extending into said cast-iorn spider; a driven clutch disk; a driven shaft carrying said disk, and means for moving said shaft endwise to cause the driven clutch disk to engage and disengage said cast iron spider.

8. A unitary electric power transmitter comprising a hollow cylindrical casing, shaft bearings at the opposite ends of said casing, coacting stationary and rotary motor elements disposed in said casing, a driven shaft journaled in said bearings, a brake carried by said casing and spaced from said rotary motor element, a driven clutch element carried by said driven shaft and disposed between said rotary motor element and said brake, and mechanism for shifting said driven shaft endwise to cause the driven clutch element to engage either the rotary motor element or said brake, said last named mechanism including a lever pivotally mounted on said casing and formed with a U-shaped end one of the limbs of which is a yieldable member, whereby the driven element is yieldingly urged against the rotary motor element when said lever is shifted to clutch engaging position.

EDGAR P. TURNER.
REYNOLD HAPPE.
ROSS D. INGALLS.

REFERENCES CITED

The following references are of record in the file of this patent:

UNITED STATES PATENTS

| Number | Name | Date |
| --- | --- | --- |
| 2,149,873 | Shapiro et al. | Mar. 7, 1939 |
| 2,263,156 | Abel | Nov. 18, 1941 |